United States Patent

Mandon

[11] Patent Number: 5,860,637
[45] Date of Patent: Jan. 19, 1999

[54] ENERGY ABSORBING ASSEMBLY

[75] Inventor: Stephane L. Mandon, La Murette, France

[73] Assignee: Caterpillar Inc., Peoria, Ill.

[21] Appl. No.: 772,963

[22] Filed: Dec. 24, 1996

[51] Int. Cl.[6] .................................................. B60G 11/02
[52] U.S. Cl. ................. 267/45; 267/51; 267/52; 267/164; 267/244; 267/247; 267/36.1; 280/124.17; 280/124.171; 280/124.1
[58] Field of Search ................. 180/9.57, 9.54; 267/51, 52, 164, 244, 45, 247, 36.1; 280/124.1, 124.11, 124.111, 124.109, 124.17, 124.171

[56] References Cited

U.S. PATENT DOCUMENTS

| | | |
|---|---|---|
| 168,430 | 5/1875 | Thomas . |
| 1,819,548 | 8/1931 | Erickson .................................. 267/45 |
| 1,824,205 | 9/1931 | Hasley . |
| 2,572,919 | 10/1951 | French ..................................... 248/21 |
| 3,185,428 | 5/1965 | Farabaugh, Jr. ........................ 248/358 |
| 3,879,025 | 4/1975 | Dillard .................................... 267/165 |
| 4,232,754 | 11/1980 | Corrigan ................................. 180/9.5 |
| 5,730,427 | 3/1998 | Hower .................................... 267/47 |

FOREIGN PATENT DOCUMENTS

3920993 A1   1/1991   Germany .

*Primary Examiner*—Brian L. Johnson
*Assistant Examiner*—Lynda Jasmin
*Attorney, Agent, or Firm*—Diana L.. Charlton

[57] ABSTRACT

Rubber shock absorber systems for use between the frame and equalizer bar of a construction vehicle usually fail to withstand high temperature environments. A metallic spring assembly is provided which is capable of high flexibility and durability. The spring assembly includes a first arcuate spring member and a second arcuate spring member adjacent to and inverted from the first spring member. First and second arcuate plate members are positioned against the first and second spring members respectively, and have a larger bend radius so that a clearance is created therebetween. A bolt with a plate nut threaded thereon is provided to connect the spring assembly and to provide a preload. During compressive loading, opposing end portions of the first and second spring portions are deformed to provide an energy absorbing system. The flexibility and durability of the spring assembly is controlled by the bend radius, thickness, and length of the plate members.

8 Claims, 2 Drawing Sheets

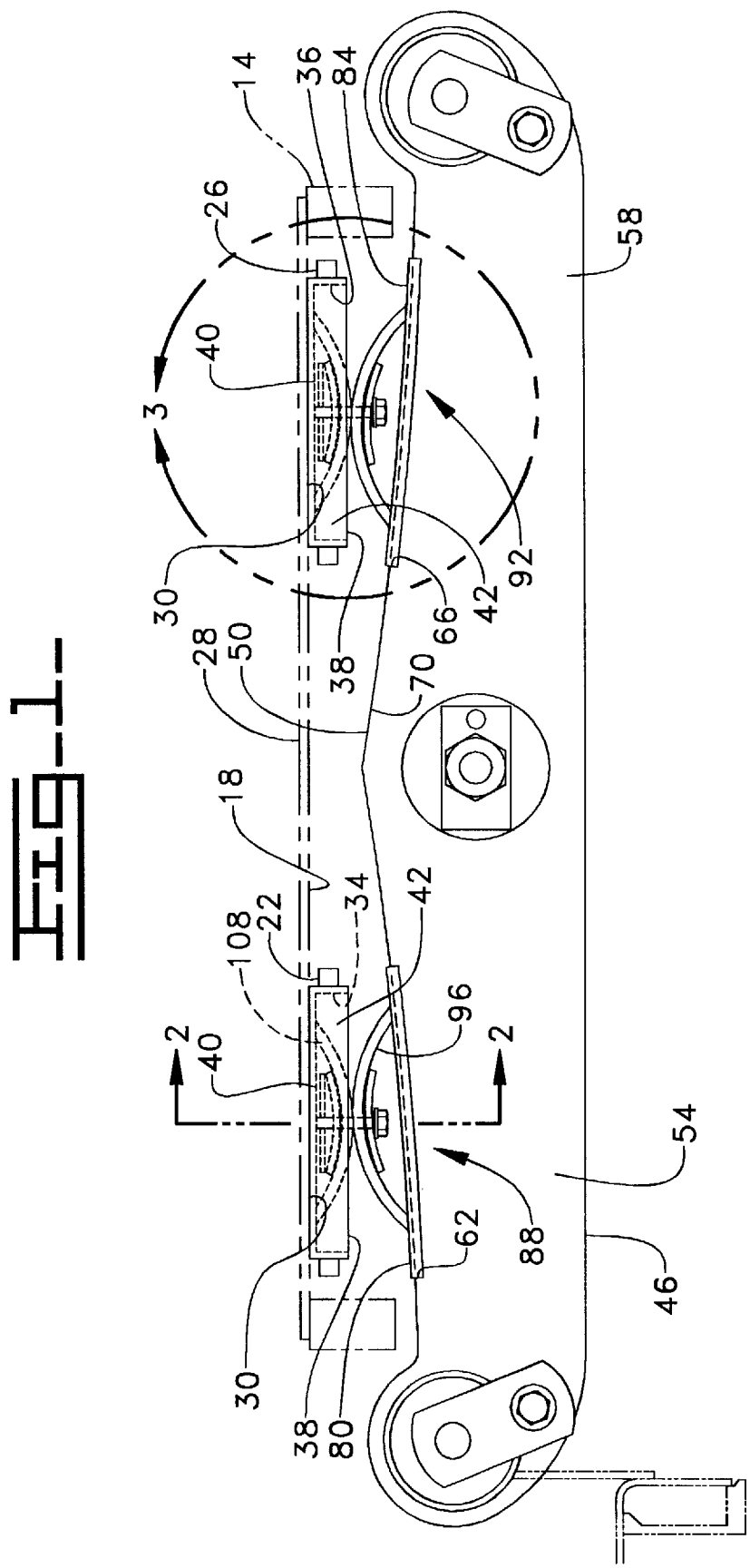

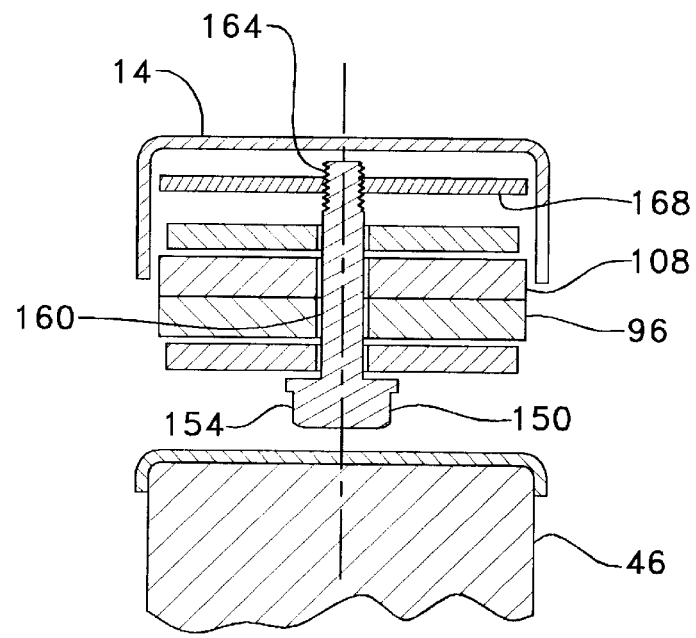
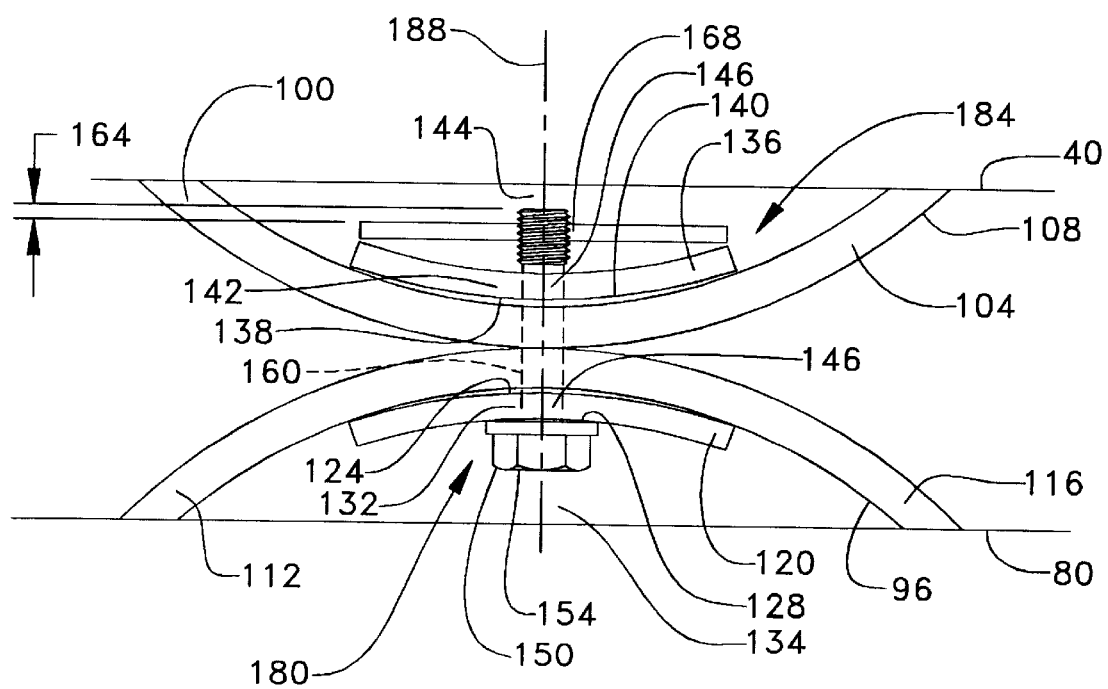

5,860,637

ENERGY ABSORBING ASSEMBLY

TECHNICAL FIELD

This invention relates generally to construction vehicles and more particularly to an energy absorbing assembly within the vehicle for use between pivotally attached components.

BACKGROUND ART

Most present construction vehicles have a rubber shock absorber system between the equalizer bar and the frame for stabilization of the rear axle portion of the vehicle. In some operational conditions, such as a steel mill environment, the vehicle must operate near fire thereby destroying the rubber material in the shock absorber system. In order to eliminate the destruction of the rubber material, a material having a resistance to high temperatures must be used. A shock absorber system utilizing such materials must also have the flexibility to achieve the desired stabilization results necessary for a construction vehicle.

An example of a spring assembly used on the rear axle of a carriage is disclosed in U.S. Pat. No. 168,430 issued to Chauncey Thomas on Oct. 5, 1875. This design relates to a combination of transverse and longitudinal springs applied to a hanger and rear axle of a carriage body to ease motion to the carriage body and relieve the main springs of strain in various directions. The design, however, deals mainly with the relative positioning of the springs in achieving these aspects. Unfortunately, the spring design does not describe how to control the available flexibility and, in fact, is a secondary spring for increasing the life of the main springs.

The present invention is directed to overcoming the problems as set forth above.

DISCLOSURE OF THE INVENTION

In one aspect of the present invention, a pair of energy absorbing assemblies for a vehicle having a frame and an equalizer bar is movably attached to the frame for carrying the ground-engaging tractive means of the vehicle. The energy absorbing assemblies each comprise a baseplate carried by the equalizer bar. A first arcuate spring member is carried at its end portions on the baseplate and has a defined radius. A second arcuate spring member is inverted from and adjacent to the first arcuate spring member and is positioned against the frame at its end portions. The second arcuate spring member has a defined radius substantially equal to the defined radius of the first arcuate member. A first arcuate plate member is positioned between the first arcuate spring member and the baseplate and has a defined radius larger than the radius of the first arcuate spring member to define a clearance therebetween. A second arcuate plate member is positioned between the second arcuate spring member and the frame and has a defined radius larger than the radius of the second arcuate spring member to define a clearance therebetween. A fastener is positioned to secure the first spring member and the first plate member to the second spring member and the second plate member to preload the assembly.

In another aspect of the present invention, an energy absorbing assembly is used between a first and a second component which are pivotally attached for movement therebetween. A first arcuate spring member is carried at its end portions on the first component and has a defined radius. A second arcuate spring member is inverted from and adjacent to the first arcuate spring member and is positioned against the second component at its end portions. The second arcuate spring member has a defined radius substantially equal to the defined radius of the first arcuate member. A first arcuate plate member is positioned between the first arcuate spring member and the first component and has a defined radius larger than the radius of the first arcuate spring member to define a clearance therebetween. A second arcuate plate member is positioned between the second arcuate spring member and the second component and has a defined radius larger than the radius of the second arcuate spring member to define a clearance therebetween. A fastener is positioned to secure the first spring member and the first plate member to the second spring member and the second plate member to preload the assembly.

In yet another aspect of the present invention, a spring assembly comprises a first arcuate spring member having a defined radius. A second arcuate spring member is inverted from and adjacent to the first arcuate spring member and has a defined radius substantially equal to the defined radius of the first arcuate member. A first arcuate plate member is positioned against the first arcuate spring member opposite the second arcuate spring member and has a defined radius larger than the radius of the first arcuate spring member to define a clearance therebetween. A second arcuate plate member is positioned against the second arcuate spring member opposite the first spring member and has a defined radius larger than the radius of the second arcuate spring member to define a clearance therebetween. A fastener is positioned to secure the first spring member and the first plate member to the second spring member and the second plate member to preload the assembly.

The present invention, through the use of a energy absorbing assembly which is simple and easy to manufacture, provides a means for controlled flexibility between two movably attached components.

BRIEF DESCRIPTION OF THE DRAWINGS

FIG. 1 is a partial view of a construction vehicle embodying the present invention;

FIG. 2 is a partial section view taken along line 2—2 of FIG. 1; and

FIG. 3 is an enlarged section view taken along line 3—3 of FIG. 1.

BEST MODE FOR CARRYING OUT THE INVENTION

A construction vehicle which has a frame 14 with a lower surface 18 is shown in FIG. 1. A pair of housing assemblies 22,26 are positioned against the lower surface 18 of the frame 14 at an upper surface 30. However, it should be understood that the housing assemblies 22,26 may be positioned against the lower surface 18 in any conventional manner. The housing assemblies 22,26 are substantially equidistant from a central portion 28 of the frame 14. The housing assemblies 22,26 each have a recessed groove 34,36 extending from a lower surface 38 and terminating substantially at the upper surface 26 at a bottom position 40 to define a partially enclosed space 42. An equalizer bar 46 is pivotally connected to the frame 14 in any conventional manner so that movement therebetween is permitted. The equalizer bar 46 has a central portion 50 and opposing arms 54,58 sloping outwardly therefrom. The arms 54,58 are inclined from the lower surface 18 of the frame 14. The opposing arms 54,58 each have a recessed notch 62,66 at an upper surface 70 on either side of the central portion 50 of the equalizer bar 46 substantially in alignment with the recessed grooves 34,36.

Referring more specifically to FIGS. 2 and 3, a baseplate 80,84 is seated within each of the notches 62,66 and extends outwardly a predetermined distance from the upper surface 70 of the arms 54,58. A spring assembly 88,92 is positioned against each of the baseplates 80,84 between the frame 14 and the equalizer bar 46 and extends into the grooves 34,36 of the housing assemblies 22,26, respectively. It should be understood that the spring assemblies 88,92 are identical, however, for clarity only one spring assembly 88 will be described in detail.

The spring assembly 88 includes a first arcuate spring member 96 having a bend radius within a range of approximately 200 mm to 300 mm, a thickness of approximately 10 mm, and a length of approximately 250 mm and is positioned against the baseplate 80 at opposing end portions 100,104 to facilitate contact therewith. It should be understood that an additional 5 mm may be added to the length at each end to allow for a rounded and stress-relieving edge. A second arcuate spring member 108 having substantially equal bend radius, thickness, and length as the first spring member 96 is positioned adjacent to and inverted from the first spring member 96 so that opposing end portions 112, 116 are seated against the bottom of the groove 40. A first arcuate plate member 120 is positioned between the first spring member 96 and the baseplate 80. The first plate member 120 has a bend radius within a range of approximately 400 mm to 600 mm, a thickness of approximately 10 mm, and a length of approximately 100 mm. It should be understood that an additional 5 mm may be added to the length at each end to allow for rounding and stress relief. The first plate member 120 has a bend radius at least twice that of the bend radius of the first spring member 96 to define a first clearance 124 therebetween. A substantially flat portion 128 is defined near a central portion 132 of the first plate member 120 due to the large bend radius. The arcuate shape of the first spring member 96 defines a space 134 between the first plate member 120 and the baseplate 80. A second arcuate plate member 136 is positioned between the second spring member 108 and the housing assembly 22. The second plate member 136 has a bend radius, thickness, and length substantially equal to the first plate member 120. The second plate member 136 has a bend radius at least twice that of the bend radius of the second spring member 108 to define a second clearance 138 therebetween. A substantially flat portion 140 is defined near a central portion 142 of the second plate member 136 due to the large bend radius. The arcuate shape of the second spring member 108 defines a space 144 between the second plate member 136 and the bottom of the groove 34. The first and second spring members 96,108 and the first and second plate members 120,136 each have an axially aligned opening 146 defined therethrough. The first and second spring members 96,108 and the first and second plate members 120,136 are made from a metallic material capable of withstanding high temperature ranges between 1000–1500 degrees, such as steel, cast iron, and the like. A bolt 150 with a head portion 154 and a elongated threaded portion 160 secures the spring members 96,108 and plate members 120,136 together to preload the spring assembly 88. The elongated threaded portion 160 extends through the openings 146 until the head portion 154 is seated against the flat portion 128 of the first plate member 120. A predetermined length 164 of the elongated threaded portion 160 extends beyond the second plate member 136 so that a plate nut 168 may be threaded thereon. The plate nut 168 is tightened to a predetermined torque standard (M20) against the flat portion 140 of the second plate member 136 during preloading.

The first spring member 96 and the first plate member 120 define a lower assembly 180. The second spring member 108 and the second plate member 136 define an upper assembly 184. The lower and upper assemblies 180,184 are substantially centered about a primary axis 188 to provide a substantially symmetrical design with a location tolerance of approximately 1 mm.

Industrial Applicability

The spring assembly 88 is compressed between the frame 14 and the equalizer bar 46 during assembly. The position of the spring assembly 88 on the baseplate 80 avoids damage to the equalizer bar 46. Additionally, the insertion of the upper assembly 184 within the partially enclosed space 42 in the housing assembly 22 assists in positioning and holding the spring assembly 88 in place during operation of the construction vehicle. The opposing end portions 100,104, 112,116 of the first and second spring member 96,108, respectively, are placed under various compressive loads during assembly and operation. The arcuate shape and relative position of the first and second spring members 96,108 allows for a variable amount of deformation during the compressive loading which provides a shock absorbing cushion between the frame 14 and the equalizer bar 46. The preloading of the spring assembly 88 provided by the bolt 150 and nut plate 168 allows for initial loading necessary for proper operation and compression of the spring members 96,108.

The first and second plate members 120,136 are positioned on the first and second spring members 96,108 in a manner which allows for increased flexibility control of the spring assembly 88. The first and second plate members 120,136 have a bend radius which is larger than the respective bend radius of the first and second spring members 96,108. The large bend radius allows the first and second plate members 120,136 to seat against the first and second spring members 96,108 so that a clearance is formed therebetween 124,138, respectively. The clearance will not change due to the first and second plate members 120,136 position. However, clearance changes will occur if different preloading values are applied. The large bend radius flexibility of the assemblies 88,92 is increased due to the controlled optimization of the thickness and bend radii of the plates 96,108,120,136. Therefore, during compressive loading, more force is placed upon the opposing end portions 100,104,112,116 of the first and second spring members 96,108. The increased force at the opposing end portions 100,104,112,116 allows for greater flexibility of the spring assembly 88. The flexibility and durability of the design can be controlled by the bend radius, thickness, and length of the first and second plate members 120,136. Durability may be increased and stress decreased with increases to the thickness of the plate members 120,136. Additionally, the large bend radius of the first and second plate members 120,136 inherently creates the flat portions 128,140, respectively, allowing for a substantially flat abutment seat for the bolt 150 and nut 168.

In view of the above, the use of a spring assembly made from metallic materials provides a simple shock absorber between two components in a construction vehicle capable of withstanding high temperature environments. The flexibility of the metallic spring assembly is controlled through the use of arcuate plate members with larger bend radii. The spring assembly provides flexibility and durability which is controlled through the design of the plate members.

I claim:

1. A pair of energy absorbing assemblies for a vehicle having a frame and an equalizer bar pivotally attached to the frame for carrying the ground-engaging tractive means of the vehicle, the energy absorbing assemblies each comprising:

a baseplate carried by the equalizer bar;

a first arcuate spring member carried at its end portions on the baseplate and having a defined radius;

a second arcuate spring member inverted from and adjacent to the first arcuate spring member and being positioned against the frame at its end portions, the second arcuate spring member having a defined radius substantially equal to the defined radius of the first arcuate member;

a first arcuate plate member positioned between the first arcuate spring member and the baseplate and having a defined radius larger than the radius of the first arcuate spring member to define a clearance therebetween;

a second arcuate plate member positioned between the second arcuate spring member and the frame and having a defined radius larger than the radius of the second arcuate spring member to define a clearance therebetween; and a fastener positioned to secure the first spring member and the first plate member to the second spring member and the second plate member to preload the assembly.

2. The energy absorbing assemblies of claim 1 wherein first and second plate members have a substantially flat surface portion for abutment with a portion of the fastener.

3. The energy absorbing assemblies of claim 2 wherein the fastener is a bolt and a plate nut, the bolt having a head portion abutting the substantially flat portion of the first plate member and an elongated threaded body extending through the assembly with the plate nut threaded thereon for abutment against the substantially flat portion of the second plate member.

4. The energy absorbing assemblies of claim 3 wherein the first and second plate members and spring members are made from a metallic material.

5. The energy absorbing assemblies of claim 4 wherein the first spring member, the first plate member, the second spring member, and the second plate member are centered about an axis to define a symmetrical relationship therebetween.

6. The energy absorbing assemblies of claim 4 wherein the metallic material is steel.

7. An energy absorbing assembly for use between a first and a second component which are pivotally attached for movement therebetween, comprising:

a first arcuate spring member carried at its end portions on the first component and having a defined radius;

a second arcuate spring member inverted from and adjacent to the first arcuate spring member and being positioned against the second component at its end portions, the second arcuate spring member having a defined radius substantially equal to the defined radius of the first arcuate member;

a first arcuate plate member positioned between the first arcuate spring member and the first component and having a defined radius larger than the radius of the first arcuate spring member to define a clearance therebetween;

a second arcuate plate member positioned between the second arcuate spring member and the second component and having a defined radius larger than the radius of the second arcuate spring member to define a clearance therebetween; and a fastener positioned to secure the first spring member and the first plate member to the second spring member and the second plate member to preload the assembly.

8. A spring assembly, comprising:

a first arcuate spring member having a defined radius;

a second arcuate spring member inverted from and adjacent to the first arcuate spring member and having a defined radius substantially equal to the defined radius of the first arcuate member;

a first arcuate plate member positioned against the first arcuate spring member opposite the second arcuate spring member and having a defined radius larger than the radius of the first arcuate spring member to define a clearance therebetween;

a second arcuate plate member positioned against the second arcuate spring member opposite the first spring member and having a defined radius larger than the radius of the second arcuate spring member to define a clearance therebetween; and a fastener positioned to secure the first spring member and the first plate member to the second spring member and the second plate member to preload the assembly.

* * * * *